United States Patent
Shaw

(10) Patent No.: US 11,451,905 B1
(45) Date of Patent: Sep. 20, 2022

(54) SYSTEM AND METHOD FOR MULTI-CHANNEL ACOUSTIC ECHO AND FEEDBACK COMPENSATION

(71) Applicant: Social Microphone, Inc., Santa Barbara, CA (US)

(72) Inventor: David G. Shaw, Nazareth, PA (US)

(*) Notice: Subject to any disclaimer, the term of this patent is extended or adjusted under 35 U.S.C. 154(b) by 0 days.

(21) Appl. No.: 17/086,295

(22) Filed: Oct. 30, 2020

Related U.S. Application Data

(60) Provisional application No. 62/927,981, filed on Oct. 30, 2019.

(51) Int. Cl.
| | |
|---|---|
| *H04R 3/00* | (2006.01) |
| *G10L 21/02* | (2013.01) |
| *H04R 3/02* | (2006.01) |
| *H04R 27/00* | (2006.01) |
| *G10L 21/0208* | (2013.01) |

(52) U.S. Cl.
CPC ............... *H04R 3/02* (2013.01); *G10L 21/02* (2013.01); *H04R 27/00* (2013.01); *G10L 2021/02082* (2013.01)

(58) Field of Classification Search
CPC . H04R 3/00; H04R 3/005; H04R 3/02; H04R 3/04; H04R 25/45; H04R 25/453; H04R 25/505; H04R 27/00; G10L 21/02; G10L 21/0208; G10L 21/0216; G10L 21/0264; G10L 15/20; G10L 2021/02082; G10L 19/012; G10L 25/78; G10L 25/84; H04M 9/08; H04M 9/082

See application file for complete search history.

(56) References Cited

U.S. PATENT DOCUMENTS

| | | | |
|---|---|---|---|
| 5,610,909 A | 3/1997 | Shaw | |
| 10,602,270 B1 * | 3/2020 | Sorensen | ................ G10L 25/48 |
| 10,622,009 B1 * | 4/2020 | Zhang | .................... G06N 20/00 |
| 10,803,881 B1 * | 10/2020 | Fazeli | ...................... H04R 3/04 |

(Continued)

OTHER PUBLICATIONS

Van Waterschoot, Toon, and Marc Moonen. "Fifty years of acoustic feedback control: State of the art and future challenges." Proceedings of the IEEE 99.2 (2010): 288-327.

(Continued)

*Primary Examiner* — Thang V Tran
(74) *Attorney, Agent, or Firm* — James A. Cardle; Brian Billett

(57) ABSTRACT

A public address system includes audio inputs from a moderator/presenter and from one or more participants. In an embodiment, the moderator speaks first and then selects participants to speak, utilizing audio captured by participant devices. A central signal processor is configured to receive the audio inputs and to utilize a configured acoustic model to provide for acoustic echo cancellation (AEC) and feedback control (FBC) during various phases of a presentation or conference. Audio signals from the presenter and/or participants, that have been processed to remove echo, are utilized as reference signals during various phases of the audio presentation that utilize the acoustic model for either AEC or FBC. The system utilizes the knowledge that the best learning occurs during the far talking state to learn the echo path in the canceler mode (AEC) vs. the feedback mode (FBC), which usually can only train in a double-talking mode.

20 Claims, 4 Drawing Sheets

(56) References Cited

U.S. PATENT DOCUMENTS

| | | | |
|---|---|---|---|
| 10,937,441 B1* | 3/2021 | Kristjansson | G10L 21/0208 |
| 2002/0071573 A1* | 6/2002 | Finn | G10L 21/0208 |
| | | | 381/93 |
| 2005/0157866 A1* | 7/2005 | Marton | H04M 9/08 |
| | | | 379/406.08 |
| 2005/0169459 A1* | 8/2005 | Marton | H04M 9/082 |
| | | | 379/406.15 |
| 2010/0135483 A1* | 6/2010 | Mohammad | H04M 9/082 |
| | | | 379/406.08 |
| 2014/0278381 A1* | 9/2014 | Dehghani | G10L 21/0388 |
| | | | 704/206 |
| 2018/0130482 A1* | 5/2018 | Michel | G10L 21/0232 |
| 2019/0222691 A1* | 7/2019 | Shah | G10L 21/0208 |
| 2021/0020188 A1* | 1/2021 | Wung | G10L 21/0208 |

OTHER PUBLICATIONS

Youtube video: Understanding Audio Echo Cancellation | HowToAV, Roland Hemming, Retrieved May 8, 2022: URL: https://www.youtube.com/watch?v=zQCgBMiCq60.

* cited by examiner

SYSTEM AND METHOD FOR MULTI-CHANNEL ACOUSTIC ECHO AND FEEDBACK COMPENSATION

RELATED APPLICATIONS

This application claims priority from U.S. Provisional Patent Application No. 62/927,981, filed Oct. 30, 2019, which is incorporated herein in its entirety.

Additionally, the following materials are incorporated by reference in their entirety: U.S. Pat. No. 5,610,909 and T. van Waterschoot and M. Moonen, "Fifty Years of Acoustic Feedback Control: State of the Art and Future Challenges", *Proceedings of the IEEE*, Vol. 99, No. 2, pp. 289-327, February 2011.

FIELD OF THE INVENTION

The field of this invention relates generally to the control of acoustic echo and feedback.

BACKGROUND

Acoustic Echo

When sound emerges from a loudspeaker or loudspeakers into an acoustic space, where a microphone is present, there is potentially a combination of direct path components and reflections of the speaker signal as it reverberates through the acoustic space, that can be captured by the microphone. The characteristics of the echo will depend on the size of the acoustic space, the reflectivity of the various acoustic surfaces in the space, including walls, doors, furniture and people etc. Generally, the larger the room and the "harder" the surfaces, the longer will be the reverberation time or "tail" of the echo.

Acoustic specialists often refer to the duration of the reverberation with the term T60 time. This is the time period over which an initial excitation will have decayed by 60 dB. This is equivalent to a reduction in energy of 1000 times. The decibel (dB) is a measure of power on a logarithmic scale.

DESCRIPTION

Acoustic Feedback

Figure 1:
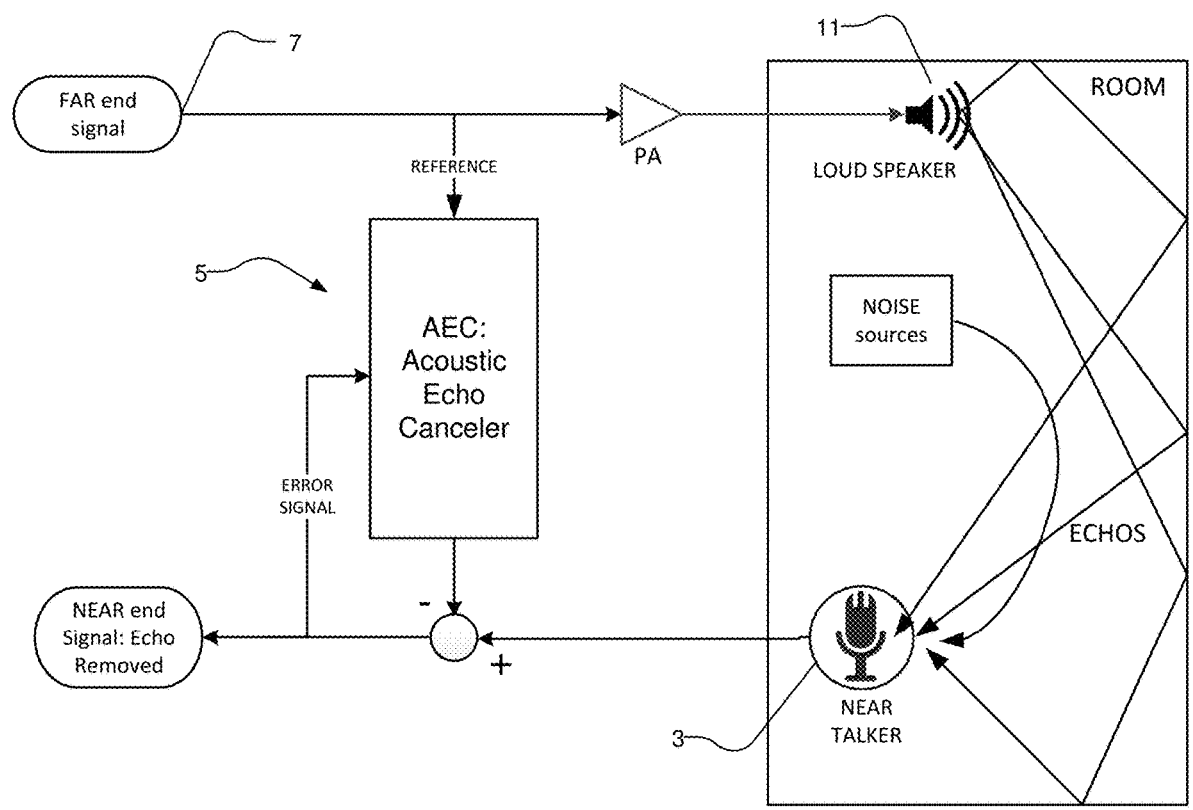
FIG. 1. depicts an acoustic echo canceller embodiment of the current disclosure.

A well-known acoustic phenomenon that occurs within a space where a public address (PA) system is in use, is that, occasionally, the output from PA loudspeaker speaker/s is received by an input microphone and reinforced again by the PA, creating a singing, screeching or howling sound. This is a worst-case situation of acoustic feedback. The actual situation may not be as bad as screeching but may simply consist of extensive reverberation of the microphone input sound so that it becomes undesirable and hard to understand. In the remainder of this disclosure, we will consider a closed loop, which starts with an input to a microphone that is then inserted into a processing chain. The output of the processing chain is passed to the PA amplifier and then to the loudspeakers. The acoustic signal from the loudspeakers returns to the microphone, either directly, and/or as a result of reflections off walls, floor, ceiling or other reflective surfaces. This closed loop is referred to as a feedback path. This path includes both electrical components, processing elements and acoustic components.

A basic version of the disclosed system provides some reduction of delayed components of a microphone signal 3 that result from the feedback of the speaker output of a public-address system (PA) that is reinforcing the original microphone input. The system may consist of a mobile phone used as a microphone into the PA system but could also make use of other wireless or wired microphones. As the PA system reinforces the microphone signal it also creates a feedback loop that can produce singing or howling. One component of the processing that protects against howling is referred to herein as a feedback canceler (FBC) 9.

The basic or preliminary techniques for feedback control uses an adaptive filter that models the feedback path in an effort to try to reduce the echo from the room without damaging the "fresh" microphone input.

In practice, the best model solution to which the adaptive filter within a feedback canceler will converge—eventually—is the same solution to which the adaptive filter will converge in a simpler and more robust acoustic echo canceler (AEC) 5.

Learning the correct acoustic path model during an echo situation is much easier compared to learning the model during a feedback situation and is much more likely to be stable. In this disclosure, a distinction is made between AEC and FBC and the learning associated with each.

For the basic disclosed system, the reference input to the adaptive filter is used in a similar fashion to the far end signal 7 in an acoustic echo canceler.

States of an Acoustic Echo Canceler

Two common terms of art are defined as the near end signal and the far end signal. The near end signal is the captured acoustic signal received by the microphone. In the context of cancellation, the far end signal is that which is played out of the speaker, and is used as a reference for the effort to find evidence of the echo of the far end signal in the near end signal. The processing performed consists of modelling the path between the far end signal and the near end signal. Once a reasonable model has been derived, the reference can be processed through the model, and the processed reference can be subtracted from the near end signal to remove the echo.

Defined Terms of the State of the System

Silence: the state that exists when neither the near nor far end signals have significant energy.

Far end talking: the state of the system when the energy of the reference signal and the evidence of it in the near end signal are not disturbed by other signals in the near end. Thus, the far end signal is dominant.

Near end talking: the state of the system when energy of the near end signal contains little or no content related to the far end signal because the far end signal is very small or silent.

Double talking: the state of the system when energy of the near end signal contains signal components that are correlated with the far end signal as well as significant energy that is uncorrelated and received from a source close to the microphone.

States of an Acoustic Feedback System

There are only two states for the feedback system. Either someone is talking into the microphone and it is being reinforced by the PA or no one is talking and there is no input to the microphone.

Silence: the state that exists when neither the near or far end signals have significant energy because the is no significant input to the microphone.

Double talking: the state where the near end signal is significant and is being reinforced by a PA system and also becomes the far end signal or reference previously mentioned as the input to the modelling process, even if no one is talking into the microphone.

Consequential difference between the echo and feedback cases:

No learning of the echo path can occur when the system is in the silent or near end talking states.

The best learning for the echo canceler is accomplished when the system is in the far end talking state.

With great care, learning can occur when the canceler is in a double-talking state, but this learning is usually very slow.

For these reasons, it is most desirable to try to learn as much as possible about the acoustic path during a far talking state. However, as mentioned, there is no far talking state in the acoustic feedback case making it very difficult to learn the echo path model with only double talking.

Creating a Learning Environment

The disclosed system utilizes the knowledge that the best learning occurs during the far talking state to learn the echo path in the canceler mode (AEC) vs. the feedback mode (FBC), and uses a sequence of states to allow for AEC training when a participant is not the active talker.

For one embodiment of a complete feedback control system, there are three software systems running:

The moderator's mobile application (insertion of participants into the queue, and selection of the active speaker)

The participant's mobile application (the source of microphone input)

The server processing (the signal processing engine that contains the acoustic echo cancellation, and feedback cancellation processing. The processing delivers the final input signal to the PA amplifier and speakers, and receives the microphone input from the device selected as the active talker. The processing is also active when a participants microphone signal is received while the specific participant is in the queue)

In the basic system, when a presenter speaks into a microphone connected directly into the PA system, his/her speech emerges into the room from the loudspeakers. Until a participant is selected, no meaningful processing in the server, to deal with feedback, is accomplished. When a participant is selected by the moderator, learning begins for that user and his/her speech is played out through the PA system. The participant will have been in the queue to speak, but nothing has been learned about his/her microphone's coupling to the speakers from the PA system, or in other words, the feedback path.

Participant Queue for the Improved System

The improved disclosed system receives the microphone signal from one, more or all of the participants while they are queued, but before they are chosen to speak by the moderator. This creates a processing queue with an opportunity for improved learning.

Training as an Echo Canceler

In various implementations of the disclosed improved system, the participants in the queue will not be the current talker, nor are they likely to be near the current talker. This means that their microphone input consists mostly of echo with little likelihood of near end signals that are uncorrelated with the echo. The processing of signals related to those in the queue is in a far talker state. As mentioned, this is the most desirable state for learning, and the processing can operate in AEC mode.

The improved system can process all of, or some of the microphone signals of those queued, or possibly only the participants most likely to be selected as the next active talker. These signals can be processed purely for the purpose of learning the echo path for the participants before they become the potential source of the feedback.

Various embodiments of the improved disclosed system can also learn the paths for the queued participants while the presenter is talking. This is an additional upgrade over the improved system just disclosed. The current embodiment of the basic system does not accommodate this capability, because the processing performed on the server has no access to the presenter's signal to use it as a reference.

It is clear that if the presenter's signal could be brought into the processing chain before going to the PA, then this additional upgrade in performance would be both available and desirable. This would allow learning of the individual acoustic paths for all of the participants in the queue, while the presenter is the active talker.

In the basic system, where only one participant can be handled at a time, the adaptive filter for a single channel just retains its own output as the reference for future inputs. This single channel mode is also relegated to the double-talking learning case.

For the improved system, the reference signal required for the learning, of each individual channel associated with each participant, can be derived from any combinations of signals that are the actual content being sent as the PA output. The content may even be from a video or audio presentation that is not even an input from a live presenter or participant. Access is required to whatever signal will be sent to the PA for reinforcement. If a given channel's output is not the current output to the PA, then that output is left un-used by the server processing except for the measurement value derived in learning the specific channel's own acoustic path.

Notice that this scheme also provides the possibility of more than one person being active at once. This multichannel capability may facilitate a more natural discussion between the presenter/s and a participant, or even multiple participants.

If processing power is limited in certain embodiments, the improved system may restrict the learning process to just the next person in the moderator's queue.

In embodiments of the improved system with sufficient processing power, then more than one channel can be learning its echo path model from the reference derived from some other participant's or the presenter's input.

In various embodiments of the improved system the individual channels have the capability to provide for learning as an AEC or as an FBC. Various embodiments utilize a simple control to inform each channel as to whether its output is currently being forwarded to the PA. In other words, "You are now the live channel." Since all of this is internal to the server processing, control passing may be performed efficiently.

Telling a channel that it is live when it is not, is far less damaging than telling it to learn as an AEC when it is in fact the live channel and needs to learn as an FBC. In various embodiments, this selection is or can be automated based on signal level measurements made within various sections of the processing channels.

In various embodiments of the improved system, the moderator has the capability to inform the participant that they need to hold the phone in the way it will need to be held when they go live, so that the participant is prepared for the transition to becoming the "live" talker. It would also be very desirable for the informed participant to be silent until they go live. This preparation by the participant will allow the processing to derive the most accurate model possible during the learning stage. These instructions can be passed to the participant through the interaction between the moderator and participant apps.

It is an advantage of the improved system that the impulse response learned for the echo path for an AEC is the same as that needed for the FBC.

In certain embodiments of the disclosed improved system, the system informs the channel that it has switched from learning to live. In certain embodiments of the disclosed improved system, it may be appropriate for the channel to determine the switch from learning to go live by itself. It is not clear how simple this would be to implement.

FIG. 1 is a diagram of the basic Acoustic Echo Canceler. From top left moving around toward top right and then down around to bottom left description as follows.

In this system, the "far" end signal 7 arrives from some remote location and is presented to the loudspeaker 11 and also used as the reference for the AEC. The sound emerges from the loudspeaker and bounces off the walls, or travels directly to, and eventually arrives at the microphone used by the near talker. The near talker's speech and any local noise are added acoustically as inputs to the near talker's microphone, along with the reverberant echo. The reference signal is run through the adaptive model and is subtracted from the combined mic inputs. The adaptation attempts to build a model that represents the "paths" through which the reference has been in the room. (The direct path between the speaker and microphone and all the reverberation of the room).

The difference between the mic input and the results of the model response being subtracted, forms an error signal that is used to update the model through adaptation, using any of the well-known adaptive filtering schemes. In various embodiments, these filtering schemes may include, Least Mean Squares (LMS), sub-band LMS, Recursive Least Squares (RLS) and many others that are well understood and documented in the literature. Once the model has converged, there should be only near speech and noise left in the error signal. This error signal may then have Noise Reduction (NR), residual echo suppression, Automatic Gain Control (AGC), Automatic Level Control (ALC), and/or other audio enhancement processing performed on it before being delivered back to the destination from where the far end signal arrived.

Under circumstances where the far end signal is present, there is no near talker active, and there is very little near end noise, the convergence of the AEC can be quite fast using an aggressive learning regime for the coefficients, then the residual error will tend toward zero.

The most fundamental concept here is that the error should have no evidence of any part of the far end signal in it when the system is completely converged.

Figure 2:
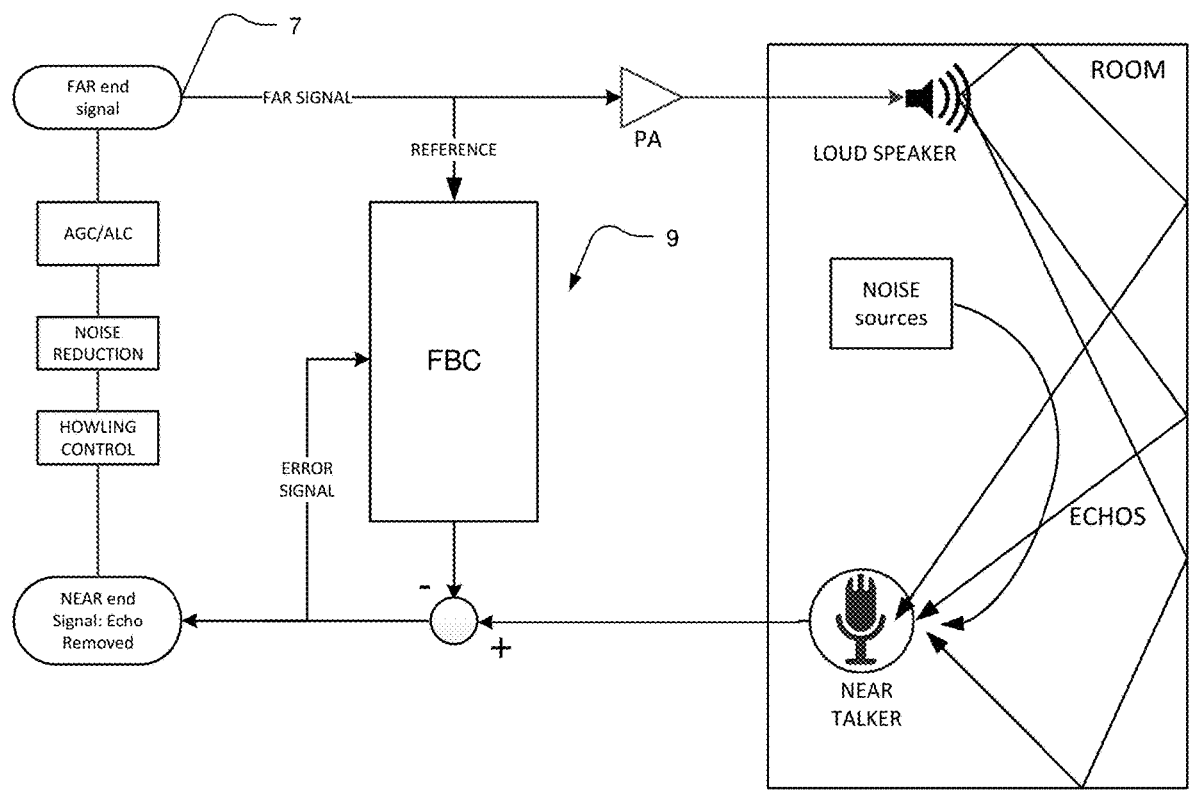
FIG. 2. depicts a feedback controller embodiment of the current disclosure.

FIG. 2 shows a single channel feedback system.

In the case of the FBC, a feedback loop has been closed, so there is no distinct "far" end signal, as the signal sent to the PA is derived from the microphone input after processing. However, the pseudo-"far" end signal here is still used as the reference for the modelling process.

The most fundamental concept here is that the "far" end signal should still contain the "fresh" signal from the near talker into the mic, but it should not have any evidence of the direct path or any reverberation residuals of the "older" near talker signal from within the room.

As one might expect, this is a much harder problem, in terms of training, than the AEC, because the only separation between the near end talker and the echoes from the room is a time delay. Also, consider that there is a continuous interferer, which is the "fresh" mic input from the near talker, that remains in the error signal. This signal is correlated in frequency content and also in time, with the mic signal and all delayed versions of itself and can easily cause confusion for the learning process in the adaptive modelling system.

To avoid divergence of the learning process, the adaptation is performed with great care to avoid divergence, a very small adaptation step size, and is therefore very slow. The residual error is never zero, and will potentially be almost as large as the microphone signal if the room is quiet and "soft" in its response.

Figure 3:
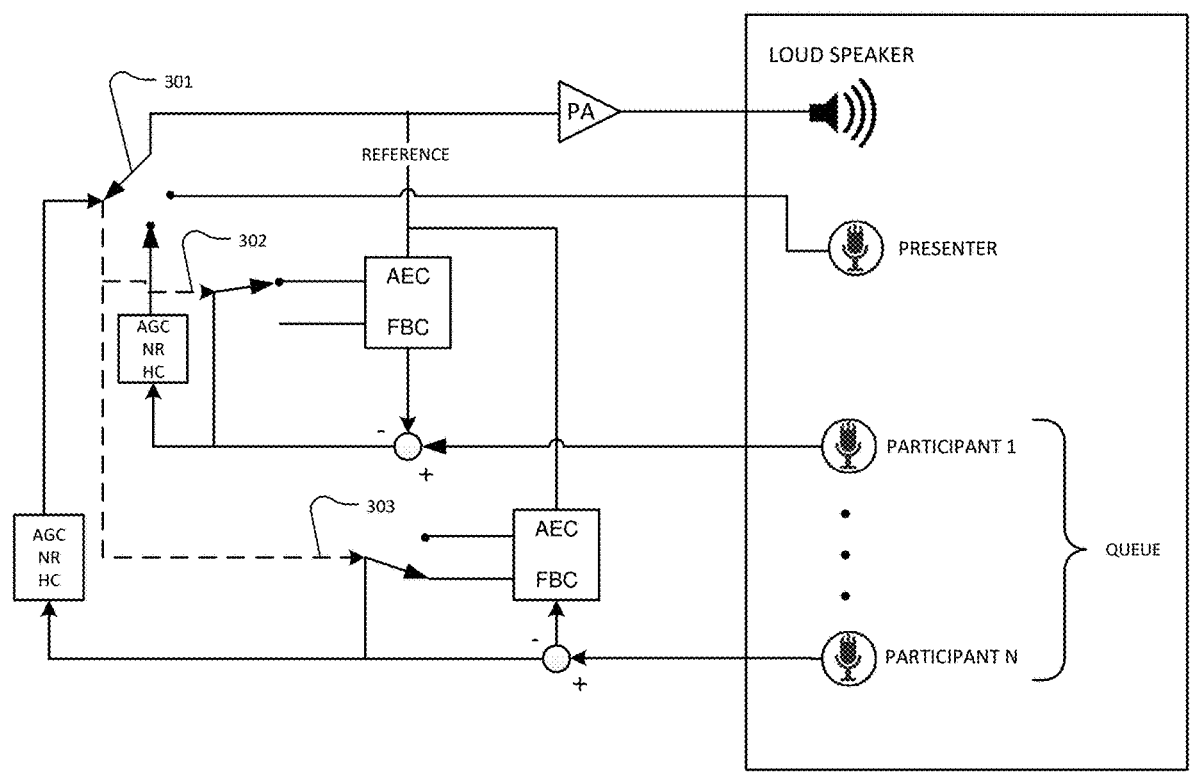
FIG. 3. depicts a combined acoustic echo canceller and feedback controller embodiment of the current disclosure.

FIG. 3 shows an embodiment of the improved system using multiple queued channels.

As shown from the basic system shown in FIG. 1, an improved system should learn the room impulse response during a true "far" talker condition. For a given participant, this condition can exist when either the presenter, other audio content from video for example, or another participant is the "live" or "active" audio into the PA system.

A component of the improved system shown in FIG. 3 are a set of selectors (301, 302, 303) controlled by either the moderator, some specific decision making software, or some automated technique within the adaptation process. For the situation outlined in the figure, the presenter's mic is unused as the current input through selector 301 which has left it open. Participant N is the active talker, as can be seen by the selection in 301. The processed signal from N is sent out to the loudspeaker through the PA. Notice that the selector 303 is routing the error signal from microphone N to the FBC functionality in channel N processing block. However, notice that the error signal from the microphone for participant 1 is available to the microphone 1 processing block as an AEC through selector 302.

The same reference is used for the modelling process for the various channels and the functionality inside an AEC and an FBC is actually the same. The major material difference is the adaptation speed which is again controlled by the adaptation step size. One exception to this thinking is that, sometimes the AEC will still have to identify a double-talking situation. Since the FBC is doing this all the time anyway, the functionality exists and only needs an internal decision-making algorithm to switch itself to double-talking training as needed.

Any number of parallel channels can be learning from the reference signal that is going to the loudspeaker. They all use the same reference, and those whose signal is not current part of the PA output can operate in AEC mode, while those whose signal is part of the PA output can operate in FBC mode.

In various embodiments, the presenter's input may also include AEC and FBC processing.

Each of the N participant microphone input channels has an equivalent set of functionality, or channel, represented by the blocks AEC, FBC, the subtraction element, the AGC, the Howling Control (HC) and the Noise Reduction (NR), or any appropriate subset or superset thereof.

In other embodiments which process input from multiple participants simultaneously, a conference bridge module is used in place of selector 301 to combine signals of active participants and the output of this bridge will then be used as the reference for all the channels.

In one embodiment of the system, the moderator or the presenter may be in control of the selection of the participants in the queue. A sequence of states may define how the participants are selected. The participants using the system, may indicate that they desire to speak. The moderator may select for specific participants to be added to the queue. When a participant is added to the queue, the AEC associated with their specific channel in the queue can begin learning their acoustic path.

An alternate embodiment a FBC may include an FBC for the presenter's microphone. When the system is being tested, the opportunity exists to allow the system to send a desirable training signal out through the PA and speaker. A home grown "far" signal, from which a model of the room can be completely characterized. When the room is filled and in active use the characteristics may be modified in this embodiment, but depending on implementation and environment, a learning process with an AEC mode and a tuning process in the FBC mode provides improved output.

The chart is an outline of the state sequencing that implements the two training modes mentioned.

Figure 4:
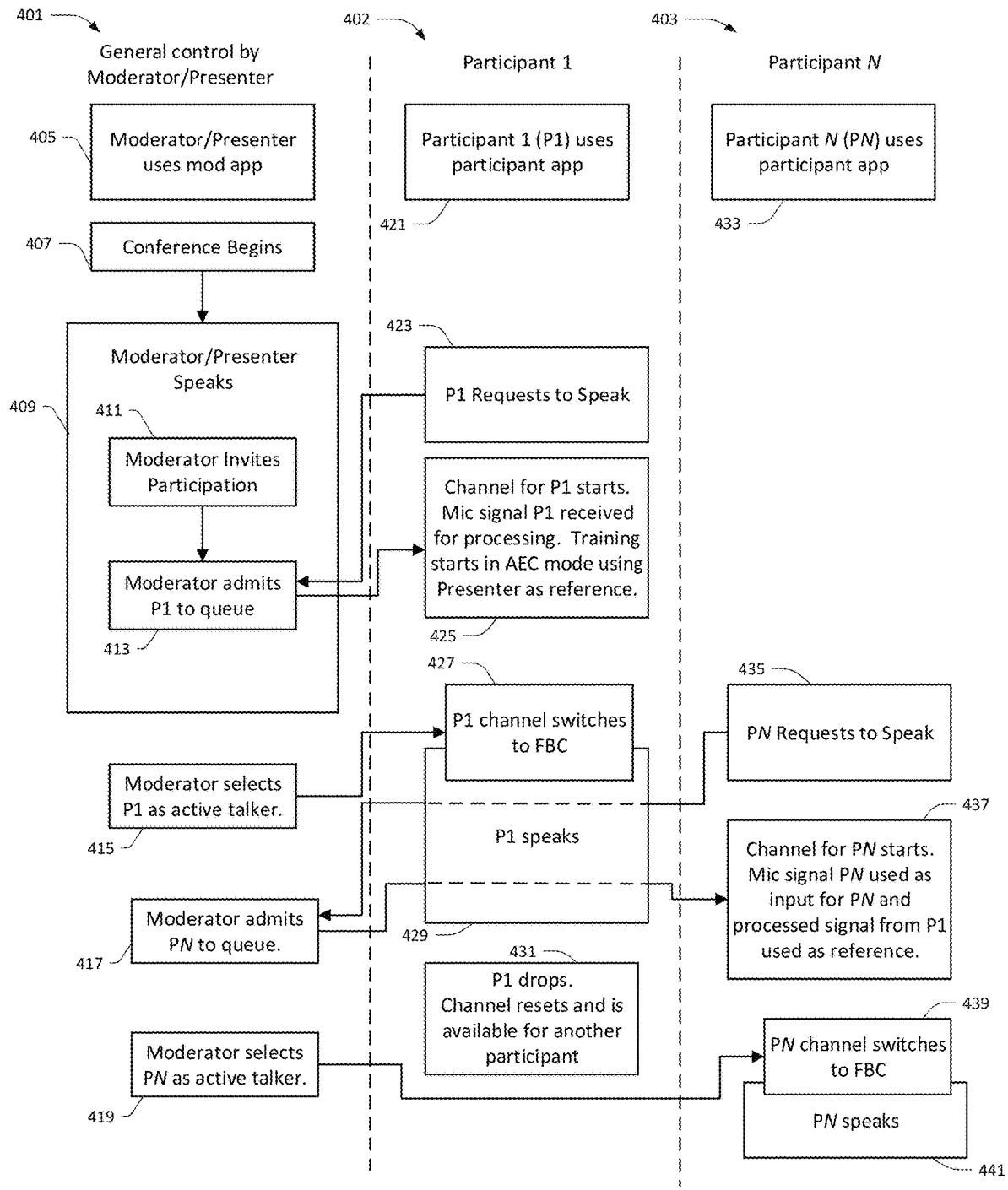
FIG. 4 depicts a swim lane state diagram showing an exemplar process for utilizing the acoustic echo canceller and feedback control of FIG. 3.

FIG. 4 depicts a swim lane type state diagram of an embodiment application in which a moderator 401 and 2 or more (non-moderator) participants 402 403 are members of or are conducting a conference. FIG. 4 depicts an exemplar process for the processing system outlined in FIG. 3.

In the diagrammed embodiment, the moderator uses a moderator app 405 on a device of choice such as a console, a computer, a tablet or a phone. The non-moderator participants use a different participant app 421 433, typically on a smartphone phone. In alternative embodiments, the moderator and participant apps are software applications which execute either entirely locally on the device, may be "thin" applications which execute primarily in the cloud or may be browser based web applications which execute almost entirely in the cloud. In each case, the local device's input device is used to capture the moderator or participant's audio.

To initiate this exemplar process, the conference begins 407, which may involve setup operations for a public address (PA) system. This PA system is configured with dedicated channels for both the presenter and participants. As with the moderator/presenter apps, the PA system may be a locally performed on a device, or may be run primarily on a cloud based server.

Next, the moderator/presenter (who may be a person acting in both capacities) opens up the presentation and begins speaking 409.

At some point during the presentation, the moderator invites participants to speak 411. Such invitation may be a simple audible invitation or may be performed by messaging through the moderator and participant apps.

In this example, Participant 1 (P1) may then request an opportunity to speak 423.

Having received the request, the moderator/presenter acknowledges the request and Participant 1 is admitted into a queue 413. In various embodiments, this queue may be a sequential or ordered set of participants requesting to speak or may be an unordered set of participants requesting to speak.

After admitting Participant 1 to the queue, a dedicated channel for processing either acoustic echo or feedback control (AEC or FBC) is opened up for input from Participant 1 425.

In this example, the app on Participant 1's device is notified 425, and the signal captured by the device microphone is transmitted from the device to the processing system and into the dedicated channel as per FIG. 3.

The dedicated channel begins the training process as an AEC based using the presenter's signal as the reference signal 425. In alternative embodiments and as described above, other audio excitation may be utilized as the reference excitation signal for learning. Note that the output from the AEC for P1 is not yet sent to the PA, so there is no feedback loop, therefore training can be done in the more aggressive AEC mode.

In this example process, at some point Participant P1 is notified through the app that P1 is about to become the speaker 415. In various embodiments, this may be automatically performed by a sequential ordered queue or may be performed manually by presenter/moderator selection of the participant from an unordered queue.

After notification, the channel for P1 processing transitions to FBC mode 427, and the P1 participant goes live through the PA system 429. This is the situation where a feedback loop can exist.

In this example, another participant-Participant N (PN) may have also already requested to speak and thus been added to the queue 417. Alternatively PN 435 may be added to the queue at any time before or after P1 speaks 417.

If PN has been added before P1 speaks, then PN will similarly be attached to a dedicated processing channel 437 and in various embodiments uses the presenter's signal as a reference for AEC training.

If PN is added to the queue during the time when P1 is the speaker, then the P1 speech, which is now the active source for the PA, will become the training signal for PN, along with any other participants who may already be in the queue (ordered or unordered) as well 437.

The decision for a channel to be in AEC or FBC mode is made based on whether that channel is also the active speaker or part of a combination of active speakers 439 441.

When P1 has completed their turn to speak, they drop from the queue 431, and the channel that had been dedicated to them is reset and made available so that an additional participant can be added to the queue.

The moderator/presenter and participants may interact with each other and the system in numerous different scenarios, one of which is outlined by this diagram. Many of these scenarios, however, include a common processing factor, which is that channel that is currently a component of the signal content emerging from the PA system may remain in FBC mode and may revert back to AEC mode if the participant is returned to the queue.

If a channel is also dedicated to the presenter's microphone input, then there may be times when the only available learning mode for feedback control will be FBC.

Training of the presenter's channel, in AEC mode, may occur if the system is set up ahead of time, or if the presenter uses independent presentation audio, at any time, that will not cause a feedback loop.

In various embodiments, including those described above, standard and known algorithms for acoustic echo cancelling (AEC) and feedback control (FBC) may be utilized for the signal processing and model training.

In an alternate embodiment, participants and the moderator/presenter are not in physical proximity such as when, for example, the conference is conducted remotely. In such an embodiment, the audio signal from participant microphones may be utilized for AEC training prior that point at which that participant actually begins speaking.

In an alternative embodiment, participants and the moderator/presenter use wired microphones or other devices capable of capturing audio, which may either be in physical proximity to each other or not.

The routines and/or instructions that may be executed by the one or more processing units to implement embodiments of the invention, whether implemented as part of an operating system or a specific application, component, program, object, module, or sequence of operations executed by each processing unit, will be referred to herein as "program modules", "computer program code" or simply "modules" or "program code." Generally, program modules may include routines, programs, objects, components, logic, data structures, and so on that perform particular tasks or implement particular abstract data types. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. Given the many ways in which computer code may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of system functionality described herein.

The flowcharts, block diagrams, and sequence diagrams herein illustrate the architecture, functionality, and operation of possible implementations of systems, methods, and computer program products according to various embodiments of the present invention. In this regard, each block in a flowchart, block diagram, or sequence diagram may represent a segment or portion of program code, which comprises one or more executable instructions for implementing the specified logical function(s) and/or act(s). Program code may be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the blocks of the flowcharts, sequence diagrams, and/or block diagrams herein. In certain alternative implementations, the functions noted in the blocks may occur in a different order than shown and described. For example, a pair of blocks described and shown as consecutively executed may be instead executed concurrently, or the two blocks may sometimes be executed in the reverse order, depending upon the functionality involved. Each block and combinations of blocks can be implemented by special purpose hardware-based systems that perform the specified functions or acts, or combinations of special purpose hardware and computer instructions.

The program code embodied in any of the applications described herein is capable of being individually or collectively distributed as a program product in a variety of different forms. In particular, the program code may be distributed using a computer readable media, which may include computer readable storage media and communication media. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising."

While the invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. For example, the embodiments of the invention may be used in conjunction with other acoustic environments. The invention in its broader aspects is therefore not limited to the specific details, representative methods, and illustrative examples shown and described. Accordingly, departures may be made from such details without departing from the spirit or scope of applicants' general inventive concept.

What has been described herein is considered merely illustrative of the principles of this invention. Accordingly, it is well within the purview of one skilled in the art to provide other and different embodiments within the spirit and scope of the invention.

What is claimed is:
1. A method for reducing acoustic echo comprising:
receiving by a central processing system, an acquired reference audio signal;
receiving by the central processing system, an acquired presenter audio signal;
receiving by the central processing system, an acquired at least one near end audio signal;

preforming, by the central processing system acoustic model training of at least one near end audio signal based on audio input acquired by a signal processing unit, concurrent to processing and amplifying the presenter audio signal;

performing, by the central processing system, echo cancellation of the at least one near end audio signal based on the corresponding at least one trained acoustic model.

2. The method for reducing acoustic echo as in claim 1 wherein the one or more near end audio signals is ascribed to a participant.

3. The method for reducing acoustic echo as in claim 1 wherein the one or more near end audio signal is ascribed to a participant and wherein the presenter audio signal is ascribed to a presenter.

4. The method for reducing acoustic echo as in claim 3 wherein the presenter speaks prior to a participant selection by the presenter from a selection queue,
whereby performing acoustic model training of the at least one acoustic model prior to a participant speaking provides echo cancellation at the time the participant speaks.

5. The method for reducing acoustic echo as in claim 1 wherein the reference audio signal is prerecorded.

6. The method for reducing acoustic echo as in claim 1 wherein the reference audio signal is synthesized.

7. The method for reducing acoustic echo as in claim 1 wherein the reference audio signal comprises audio captured from a presentation audiovisual stream.

8. The method for reducing acoustic echo as in claim 5 also comprising:
broadcasting the reference audio signal into an acoustic space prior to the step of performing acoustic model training.

9. The method for reducing acoustic echo as in claim 1 wherein the function of an acoustic canceler may be configured to switch from acoustic echo cancelling to feedback control by the act of having the presenter select a participant.

10. The method for reducing acoustic echo as in claim 6 wherein the acoustic canceler is configured to switch automatically from acoustic echo cancelling to feedback control when the participant's position in the queue is a next selection.

11. The method for reducing acoustic echo as in claim 1 wherein a presenter's feedback control is configured to adapt based on the presenter's microphone signal.

12. The method for reducing acoustic echo as in claim 1 wherein a selected participant's feedback control is configured to adapt based on the selected participant's processed microphone signal.

13. The method for reducing acoustic echo as in claim 1 wherein the echo cancellation is configurable to process the reference audio signal either for acoustic echo cancellation adaptation or for feedback control adaptation.

14. The method for reducing acoustic echo as in claim 1 wherein training of the acoustic model is configured to utilize as input a participant audio signal of one or more participants as an input parameter for learning an acoustic path of the respective participant.

15. A system for acoustic echo cancelling comprising:
a central processing system, wherein the central processing system receives an acquired reference audio signal, an acquired presenter audio signal and an acquired at least one near end audio signal;
and wherein central processing system performs acoustic model training by at least one acoustic model of the at least one near end audio signal based on audio input acquired by a signal processing unit, concurrent to processing and amplifying the presenter audio signal;
and wherein the central processing system performs echo cancellation of the at least one near end audio signal based on the corresponding at least one trained acoustic model.

16. The system for reducing acoustic echo as in claim 15 wherein the one or more near end audio signals is ascribed to a participant.

17. The system for reducing acoustic echo as in claim 15 wherein the one or more near end audio signal is ascribed to a participant and wherein the presenter audio signal is ascribed to a presenter.

18. The system for reducing acoustic echo as in claim 17 wherein the presenter speaks prior to a participant selection by the presenter from a selection queue,
whereby performing acoustic model training of the at least one acoustic model prior to a participant speaking provides echo cancellation at the time the participant speaks.

19. The system for reducing acoustic echo as in claim 15 wherein the reference audio signal is prerecorded.

20. The system for reducing acoustic echo as in claim 15 wherein the reference audio signal is synthesized.

* * * * *